Figure 1:
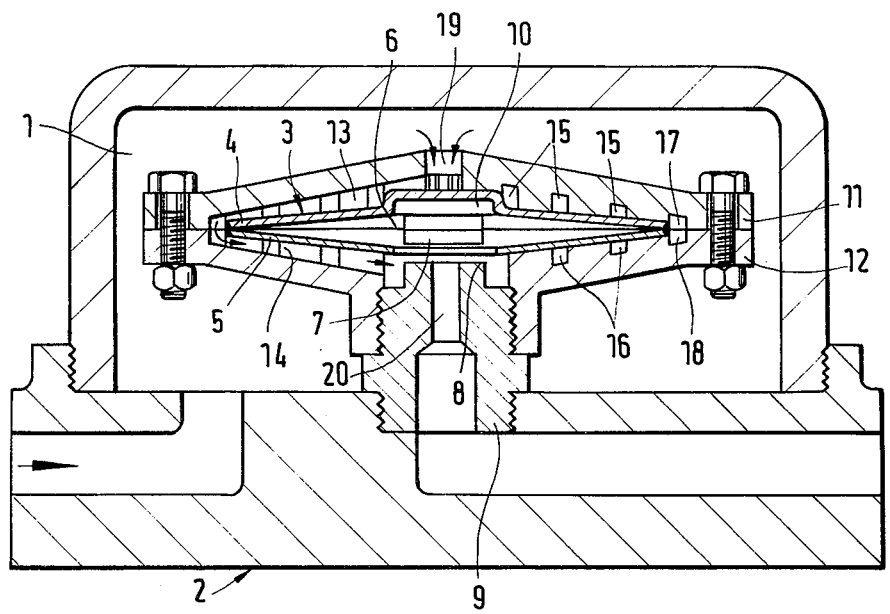

United States Patent [19]

Föller

[11] 4,244,518
[45] Jan. 13, 1981

[54] THERMALLY-CONTROLLED VALVE

[75] Inventor: Werner Föller, Stuhr, Fed. Rep. of Germany

[73] Assignee: Gestra-KSB Vertriebsgesellschaft mbH & Co. KG, Bremen, Fed. Rep. of Germany

[21] Appl. No.: 66,895

[22] Filed: Aug. 16, 1979

[30] Foreign Application Priority Data

Aug. 28, 1978 [DE] Fed. Rep. of Germany ....... 2837538

[51] Int. Cl.³ .............................................. F16T 1/10
[52] U.S. Cl. .................................... 236/58; 236/93 A
[58] Field of Search ................ 236/56, 58, 93 A, 99 J; 165/40; 73/368.3

[56] References Cited

U.S. PATENT DOCUMENTS

| 598,824 | 2/1898 | Stuckl | 236/58 |
| 748,888 | 1/1904 | Still | 236/58 |
| 986,967 | 3/1911 | Dunham | 236/58 X |
| 1,572,970 | 2/1926 | Stalker | 236/58 X |
| 2,289,020 | 7/1942 | Jones | 236/58 |
| 4,161,278 | 7/1979 | Klann et al. | 236/56 |

FOREIGN PATENT DOCUMENTS 1526972 7/1969 Fed. Rep. of Germany ............ 236/58

Primary Examiner—William E. Tapolcai, Jr.
Attorney, Agent, or Firm—Allison C. Collard; Thomas M. Galgano

[57] ABSTRACT

A valve is disclosed of the type which includes a thermal control element having at least one relatively thin rigid wall portion, a flexible membrane coupled to the periphery of the wall portion so as to define therebetween an expansion chamber in which an expansion medium is disposed, and a locking member which is actuated by the membrane for cooperative coaction with a valve seat. The valve is characterized by the provision of a relatively thick-walled, jacket-type housing which encompasses the control element in a supporting manner. The housing has flow conduits which oppose and run along the surface of the control element; the flow conduits being provided with an input and output opening for the medium to be discharged. The valve is particularly useful for steam traps.

13 Claims, 2 Drawing Figures

THERMALLY-CONTROLLED VALVE

The invention relates to a valve. More particularly, it concerns steam traps of the type which include a thermal control element having at least one relatively thin rigid wall portion, a flexible membrane coupled to the periphery of the wall portion so as to define therebetween an expansion chamber in which an expansion medium is disposed, and a locking member which is actuated by the membrane for cooperative coaction with a valve seat.

In cup-shaped thermal control elements (for example, bellows and siphon diaphragms) not only the elastic but also the rigid wall parts are made of relatively thin walls, so as to provide a sufficiently large moveability of the elastic part, a good heat transfer characteristic and a good weldability between the rigid and the elastic parts. On account of the thin walls, the load capacity of such control elements with high differential pressures is rather limited.

For example, if such a thermal control element is used in a steam trap having high operating pressures (for example, 40 PN and higher) and where it would be exposed to superheated steam, which is quite possible, a very high inner excess pressure of the expansion medium is generated in the control element. The result is a deformation and breaking up or rupture of the control element.

It is therefore an object of the invention to provide a valve of the aforementioned type having a thin wall which is not subject to dangerous rupture due to high inner pressures.

This object of the invention is obtained by the provision of a relatively thick-walled, jacket-type housing which encompasses the control element in a supporting manner. The housing has flow conduits which oppose and run along the surface of the control element, which flow conduits are provided with an input and output opening for the medium to be discharged.

The aforementioned jacket-type housing may be provided with sufficiently thick walls and can consequently be stiff enough, so as to support an individual or plurality of rigid wall portions of the control element, even against excessive high inner pressure, thereby preventing a deformation of the same. The membrane member also is sufficiently supported by the jacket-type housing. The membrane member either directly engages the jacket-type housing or is supported by a thin support wall in the control element. The control element is immediately exposed to the medium to be discharged by means of the flow conduits provided in the jacket-type housing, so that a good and "reaction-quick" heat transfer is assured between the medium to be discharged to the outside and the expansion medium within the control element.

An important advantage of the instant valve is that the thermal control elements may be mass produced and may be used for lower operating pressures in an economical manner.

Preferably, the valve closing point, which is the position at which the locking manner engages the valve seat, is disposed within the jacket-type housing and the flow conduits define a flow path which leads to this valve closing point. These features affect a forced and, therefore, an intensive flow of the medium to be discharged through the flow conduits of the jacket-type housing which enhances the sensitivity of response of the control element.

Most advantageously, the jacket-type housing has a face disposed opposite of the valve seat which is provided with at least one input opening for connecting the valve input with the flow conduits. This feature provides the prerequisites for a constant flow around the control element in the jacket-type housing. Most desirably, the flow conduits are disposed in a special arrangement in the jacket-type housing. In particular, the flow conduits desirably comprise grooves which are formed in inner wall faces of the jacket-type housing and which open onto the surface of the control element.

An especially flat construction shape for the jacket-type housing is achieved when the jacket-type housing consists of two generally cup-shaped elements which are coupled with each other at their respective edges. A particularly simple solution concerning the connection between the flow conduits of the two cup-shaped members is achieved when at least one of the two cup-shaped members is provided with an annular groove in the area adjacent to its coupled edge outwardly of the control element, and which communicates with the flow conduits of the cup-shaped members. In each given relative circumferential position of the two cup-shaped members, it is assured that the medium to be discharged flows from the flow conduits at the side remote from the valve seat of the control element to the side which is closest to the valve seat.

In a further preferred embodiment of the jacket-type housing, at least the cup-shaped member which is disposed remote from the valve seat consists of an outer rim having inner support spokes. In this embodiment, the slots between the support spokes may simultaneously form the supply flow openings and the flow conduits.

For an advantageous mounting of the jacket-type housing and, in turn, the control element, in the valve housing, the jacket-type housing may be stationarily retained on a valve seat bushing in the valve housing. Most advantageously, the cup-shaped member closest to the valve seat and the valve seat bushing are a unitary piece.

Other objects and features of the present invention will become apparent from the following detailed description, considered in connection with the accompanying drawing, which discloses a single embodiment of the invention. It is to be understood, however, that the drawing is designed for the purpose of illustration only, and not as a definition of the limits of the invention.

Figure 2:
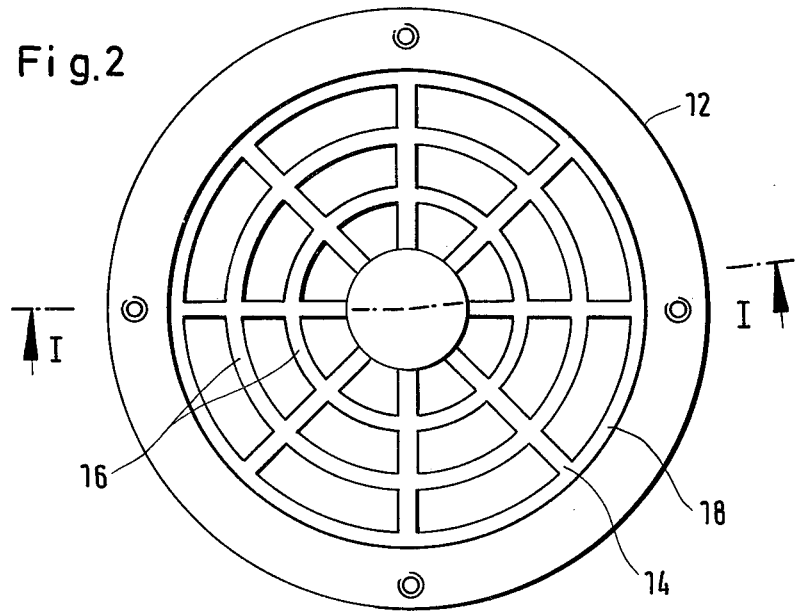

In the drawing, wherein similar reference characters denote similar elements throughout the several views:

FIG. 1 is a sectional view of a thermally-controlled steam trap embodying the present invention, taken along line I—I of FIG. 2; and FIG. 2 is a plan view of a cup-shaped member disposed in close proximity to the valve seat of the aforementioned steam trap.

Referring now in detail to the drawing, therein illustrated is a thermal control element 3, which is provided in an inner chamber 1 of a valve housing 2. Control element 3 is composed of two thin-walled portions or parts 4, 5, as well as an intermediary membrane member 6 peripherally welded to the thin-walled parts 4, 5. Membrane member 6 supports a locking member 7 which cooperates or coacts with a valve seat 8 positioned on a valve bushing 9. An expansion chamber 10 is formed between rigid wall part 4 and membrane member 6 of control element 3 and it contains an expansion medium, preferably an evaporation liquid.

Control element 3 is encompassed by a thick-walled, jacket-type housing which is composed of two cup-shaped members 11, 12 which are coupled with each other at their edges. The cup-shaped member 12 which is nearest the valve seat 8 is rigidly retained on valve seat bushing 9. On their interior surfaces, both cup-shaped member 11, 12 are provided with radially running grooves 13, 14 and concentric lateral grooves 15, 16 (see FIG. 2). Furthermore, both cup-shaped members 11, 12 are provided with annular grooves 17, 18 which are open and in communication with respect to each other and which are positioned between the peripheral edge support faces of the cup-shaped members and the outer edge of control element 3. Finally, the cup-shaped element 11 which is remote from valve seat 8 is provided with a central supply opening 19 which discharges into grooves 13.

During discharge the condensate flows from the housing inner chamber 1 through the supply opening 19 and into radially-running grooves 13 and the lateral grooves 15 of the cup-shaped member 11. The condensate then flows through annular grooves 17, 18 into radially-running grooves 14 and the lateral grooves 16 and, finally, to valve seat opening 20.

As a result, the control element 3 in jacket housing 11, 12 is immediately and at all sides exposed to, or substantially immersed in, the discharging condensate, so that the temperature in expansion chamber 10 adjusts in quick reaction to the given temperature of the flowing condensate, so that a hesitant-free operation of control element 3 is assured.

The thin-walled wall portions 4, 5 of the control element 3 by themselves are not adequately resistant against high excess pressures in expansion chamber 10. During the unavoidable exposure of control element 3 to superheated steam having a high pressure, high inner pressures are generated in control element 3. However, since the two very stiff cup-shaped elements 11, 12 engage in a supporting manner on the two wall parts 4, 5 of control element 3, the latter is sufficiently protected against deformation or breaking due to excessive inner pressure. The grooves 13, 14 and the lateral grooves 15, 16 which interrupt the support faces are dimensioned so small in their width that no overstressing of control element 3 can occur at these areas or zones.

While only one embodiment of the present invention has been shown and described, it will be obvious that many modifications and changes may be made therunto, without departing from the spirit and scope of the invention.

What is claimed is:

1. In a valve of the type which includes a valve housing having a valve seat, a thermal control element mounted in said valve housing having at least one relatively thin rigid wall portion, a flexible membrane coupled to the periphery of the wall portion so as to define therebetween an expansion chamber in which an expansion medium is disposed, and a locking member which is actuated by the membrane for cooperative coaction with the valve seat, the improvement comprising:
said valve including a relatively thick-walled, jacket-type housing which is mounted in said valve housing and which encompasses said control element in a supporting manner, said jacket-type housing having flow conduits which oppose and run along the surface of said control element, said flow conduits being provided with an input and output opening for the medium to be discharged, wherein said valve has a valve closing point, which is the position at which the locking member engages the valve seat, disposed within said jacket-type housing and wherein said flow conduits define a flow path which leads to said valve closing point.

2. In a valve of the type which includes a valve housing having a valve seat, a thermal control element mounted in said valve housing having at least one relatively thin rigid wall portion, a flexible membrane coupled to the periphery of the wall portion so as to define therebetween an expansion chamber in which an expansion medium is disposed, and a locking member which is actuated by the membrane for cooperative coaction with the valve seat, the improvement comprising:
said valve including a relatively thick-walled, jacket-type housing which is mounted in said valve housing and which encompasses said control element in a supporting manner, said jacket-type housing having flow conduits which oppose and run along the surface of said control element, said flow conduits being provided with an input and output opening for the medium to be discharged and said flow conduits comprising grooves which are formed in inner wall faces of said jacket-type housing and which open onto the surface of said control element.

3. In a valve of the type which includes a valve housing having a valve seat, a thermal control element mounted in said valve housing having at least one relatively thin rigid wall portion, a flexible membrane coupled to the periphery of the wall portion so as to define therebetween an expansion chamber in which an expansion medium is disposed, and a locking member which is actuated by the membrane for cooperative coaction with the valve seat, the improvement comprising:
said valve including a relatively thick-walled, jacket-type housing comprising two generally cup-shaped elements which are coupled with each other at their respective edges, which are mounted in said valve housing and which encompass said control element in a supporting manner, said cup-shaped elements of said jacket-type housing having flow conduits which oppose and run along the surface of said control element, said flow conduits being provided with an input and output opening for the medium to be discharged and at least one of said two cup-shaped elements being provided with an annular groove in the area adjacent to its coupled edge and disposed outwardly of said control element, and wherein said flow conduits of said cup-shaped members communicate with said annular groove.

4. In a valve of the type which includes a valve housing having a valve seat, a thermal control element mounted in said valve housing having at least one relatively thin rigid wall portion, a flexible membrane coupled to the periphery of the wall portion so as to define therebetween an expansion chamber in which an expansion medium is disposed, and a locking member which is actuated by the membrane for cooperative coaction with the valve seat, the improvement comprising:
said valve including a relatively thick-walled, jacket-type housing comprising two generally cup-shaped elements which are coupled with each other at their respective edges, which are mounted in said valve housing and which encompass said control element in a supporting manner, said cup-shaped elements of said jacket-type housing having flow conduits which oppose and run along the surface of said control element, said flow conduits being provided with an input and output opening for the medium to be discharged and at least the cup-shaped member which is disposed remote from said valve seat comprises an outer rim having inner radially-directed support spokes, the latter of which have slots therebetween which define, at least in part, said flow conduits.

5. In a valve of the type which includes a valve housing having a valve seat, a thermal control element mounted in said valve housing having at least one relatively thin rigid wall portion, a flexible membrane coupled to the periphery of the wall portion so as to define therebetween an expansion chamber in which an expansion medium is disposed, and a locking member which is actuated by the membrane for cooperative coaction with the valve seat, the improvement comprising:

said valve including a relatively thick-walled, jacket-type housing comprising two generally cup-shaped elements which are coupled with each other at their respective edges, which are mounted in said valve housing and which encompass said control element in a supporting manner, said cup-shaped elements of said jacket-type housing having flow conduits which oppose and run along the surface of said control element, said flow conduits being provided with an input and output opening for the medium to be discharged and said valve additionally including a valve seat bushing within said valve housing on which said jacket-type housing is stationarily retained.

6. The valve according to claim 2, 3, 4 or 5, wherein the valve closing point, which is the position at which the locking member engages the valve seat, is disposed within said jacket-type housing and wherein said flow conduits define a flow path which leads to said valve closing point.

7. The valve according to claim 1, 2, 3, 4 or 5, wherein said jacket-type housing has a face disposed opposite of said valve seat which is provided with at least one input opening for connecting the valve input with said flow conduits.

8. The valve according to claim 1, 3, 4 or 5, wherein said flow conduits comprise grooves which are formed in inner wall faces of said jacket-type housing and which open onto the surface of said control element.

9. The valve according to claim 1 or 2, wherein said jacket-type housing comprises two generally cup-shaped elements which are coupled with each other at their respective edges.

10. The valve according to claim 4 or 5, wherein at least one of said two cup-shaped elements is provided with an annular groove in the area adjacent to its coupled edge outwardly of said control element, and wherein said flow conduits of said cup-shaped members communicate with said annular groove.

11. The valve according to claim 12 or 14, wherein at least the cup-shaped member which is disposed remote from said valve seat consists of an outer rim having inner radially-directed support spokes, the latter of which has slots therebetween which define, at least in part, said flow conduits.

12. The valve according to claim 1, 2, 3 or 4, additionally including a valve seat bushing within said valve housing on which said jacket-type housing is stationarily retained.

13. The valve according to claim 12, wherein the cup-shaped member closest to said valve seat and said valve seat bushing are a unitary piece.

* * * * *